United States Patent
Li et al.

(10) Patent No.: US 12,411,339 B2
(45) Date of Patent: Sep. 9, 2025

(54) DUSTPROOF MEMBER, CAMERA MODULE HAVING THE DUSTPROOF MEMBER AND ELECTRONIC DEVICE HAVING THE CAMERA MODULE

(71) Applicant: TRIPLE WIN TECHNOLOGY(SHENZHEN) CO.LTD., Shenzhen (CN)

(72) Inventors: Kun Li, Guangdong (CN); Ding Feng, Jincheng (CN); Jian-Chao Song, Guangdong (CN); Wu-Tong Wang, Jincheng (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 601 days.

(21) Appl. No.: 17/865,574

(22) Filed: Jul. 15, 2022

(65) Prior Publication Data
US 2023/0375827 A1 Nov. 23, 2023

(30) Foreign Application Priority Data
May 20, 2022 (CN) .......................... 202210557005.9

(51) Int. Cl.
*G02B 27/00* (2006.01)
*G03B 11/04* (2021.01)

(52) U.S. Cl.
CPC ........ *G02B 27/0006* (2013.01); *G03B 11/043* (2013.01)

(58) Field of Classification Search
CPC .................. G02B 27/0006; G03B 11/043
USPC ..................................... 359/217.1
See application file for complete search history.

(56) References Cited

U.S. PATENT DOCUMENTS

| | | | |
|---|---|---|---|
| 2013/0128108 A1* | 5/2013 | Oh ......................... | H04N 23/54 348/374 |
| 2017/0083732 A1* | 3/2017 | Handshaw ......... | G06K 7/10881 |
| 2019/0361193 A1* | 11/2019 | Zhang ..................... | G02B 5/003 |
| 2020/0057240 A1* | 2/2020 | Yu ......................... | G03B 21/145 |
| 2020/0110243 A1* | 4/2020 | Lee ....................... | H02K 41/031 |

OTHER PUBLICATIONS

Inaba Akira JP 2022059310; Lens Unit and Camera Module (Examiner provided machine translation) (Year: 2020).*

* cited by examiner

*Primary Examiner* — Bumsuk Won
*Assistant Examiner* — Rahman Abdur
(74) *Attorney, Agent, or Firm* — ScienBiziP, P.C.

(57) ABSTRACT

A dustproof member includes a base plate, a dustproof plate, and a connecting portion. A first through hole is defined by an inner surface of the base plate. A second through hole is defined by an inner surface of the dustproof plate. The connecting portion has a shape of a hollow barrel and defines a hollow cavity. Two opposite ends of the connecting portion are respectively connected to an end of the inner surface of the base plate and an end of the inner surface of the dustproof plate, thereby forming a dust collecting groove between the base plate and the dustproof plate. A camera module having the dustproof member and an electronic device having the camera module are also provided.

12 Claims, 6 Drawing Sheets

DUSTPROOF MEMBER, CAMERA MODULE HAVING THE DUSTPROOF MEMBER AND ELECTRONIC DEVICE HAVING THE CAMERA MODULE

FIELD

The subject matter herein generally relates to a dustproof member, a camera module having the dustproof member, and an electronic device having the camera module.

BACKGROUND

Most camera modules include a lens, a voice coil motor, a filter, a photosensitive chip, a holder, and a circuit board. The lens is installed in the voice coil motor, and a gap is formed between the lens and the voice coil motor. When dust and impurities enter from the gap and fall on the filter, the image becomes stained, and the dust and impurities will also rise and fall when the camera module is shaken or dropped.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
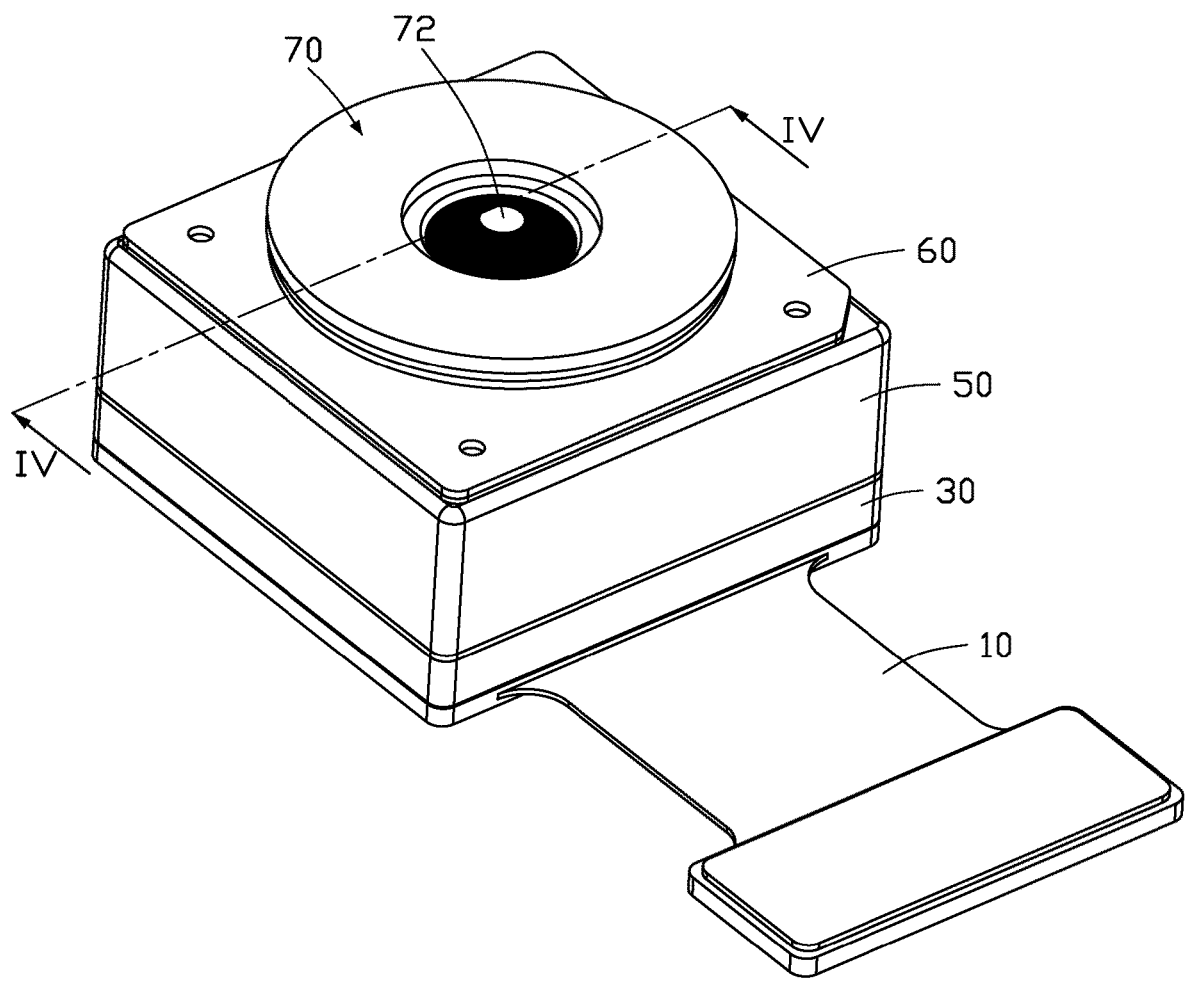
FIG. 1 is a diagram of an embodiment of a camera module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
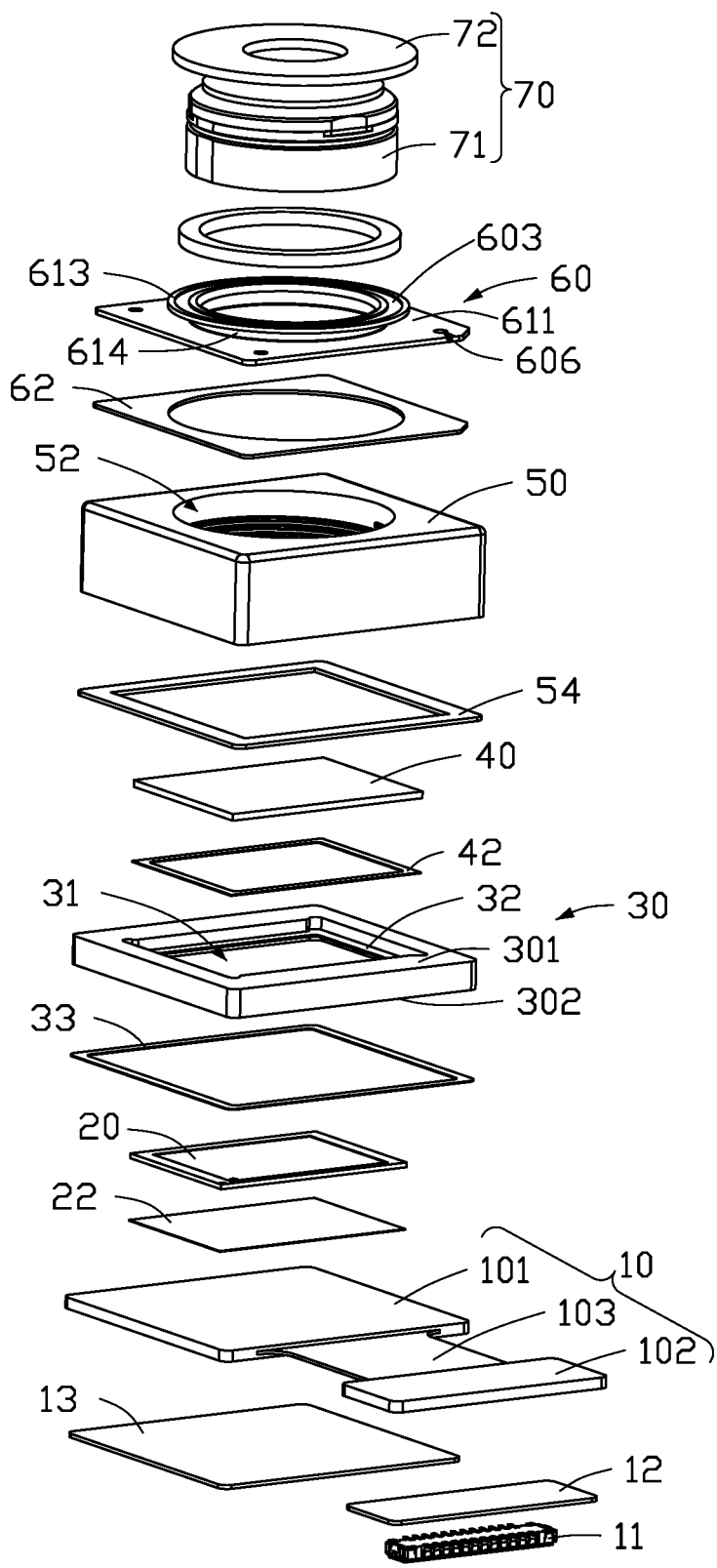
FIG. 2 is an exploded, diagrammatic view of an embodiment of a camera module according to the present disclosure.

FIG. 1 illustrates a first embodiment of a camera module 100. Referring to FIGS. 1 and 2, the camera module 100 includes a circuit board 10, a photosensitive chip 20, a holder 30, a filter 40, a voice coil motor 50, a dustproof member 60, and a lens assembly 70. The photosensitive chip 20 is arranged on a surface of the circuit board 10. The holder 30 is mounted on the surface of the circuit board 10. The voice coil motor 50 is located at a side of the holder 30 facing away from the circuit board 10. The filter 40 is located at a side of the photosensitive chip 20 facing away from the circuit board 10 and is spaced from the photosensitive chip 20. The filter 40 is mounted in the holder 30 and corresponds to the photosensitive chip 20. The dustproof member 60 is arranged on a surface of the voice coil motor 50 facing away from the holder 30. A part of the lens assembly 5 is received in the voice coil motor 50.

In at least one embodiment, the circuit board 10 may be a flexible circuit board, a rigid circuit board, or a flexible-rigid circuit board. Specifically, the circuit board 10 is a flexible-rigid circuit board, and includes a first rigid portion 101, a second rigid portion 102, and a flexible portion 103. The flexible portion 103 is connected to the first rigid portion 101 and the second rigid portion 102.

The circuit board 10 may further include an electrical connecting portion 11 mounted on the second rigid portion 102. When the camera module 100 is applied in an electronic device (such as mobile phone), the electrical connecting portion 11 is used to implement signal transmission between the camera module 100 and other components of the electronic device.

The circuit board 10 may further include a first reinforcement plate 12 and a second reinforcement plate 13. The first reinforcement plate 12 is mounted on a surface of the second rigid portion 102 facing away from the electrical connecting portion 11, the second reinforcement plate 13 is mounted on a surface of the first rigid portion 101 facing away from the holder 30. In at least one embodiment, a material of the first reinforcement plate 12 and the second reinforcement plate 13 are both metal (such as stainless steel).

The photosensitive chip 20 may be mounted on the first rigid portion 101 by a first adhesive layer 21.

The holder 30 may be fixed on the first rigid portion 101 by a second adhesive layer 23. The holder 30 may be substantially a hollow rectangular structure and includes a first surface 301 and a second surface 302 facing away from the first surface 301. The first surface 301 faces the voice coil motor 50, the second surface 302 facing the circuit board 10. A third through hole 31 is defined in the holder 30 and penetrates the first surface 301 and the second surface 302. A groove 32 is recessed inward from the first surface 301, and the groove 32 surrounds and communicates with the third through hole 31. The filter 40 is received in the groove 32.

In at least one embodiment, the filter 40 may be substantially rectangular. The filter 40 is fixed in the holder 30 by a third adhesive layer 42.

The voice coil motor 50 may be substantially a hollow rectangular structure. A receiving hole 52 penetrates the voice coil motor 50. A part of the lens assembly 70 is received in the receiving hole 52. The voice coil motor 50 is fixed on the holder 30 by a fourth adhesive layer 54. The voice coil motor 50 may be made of metal or plastic.

Figure 3:
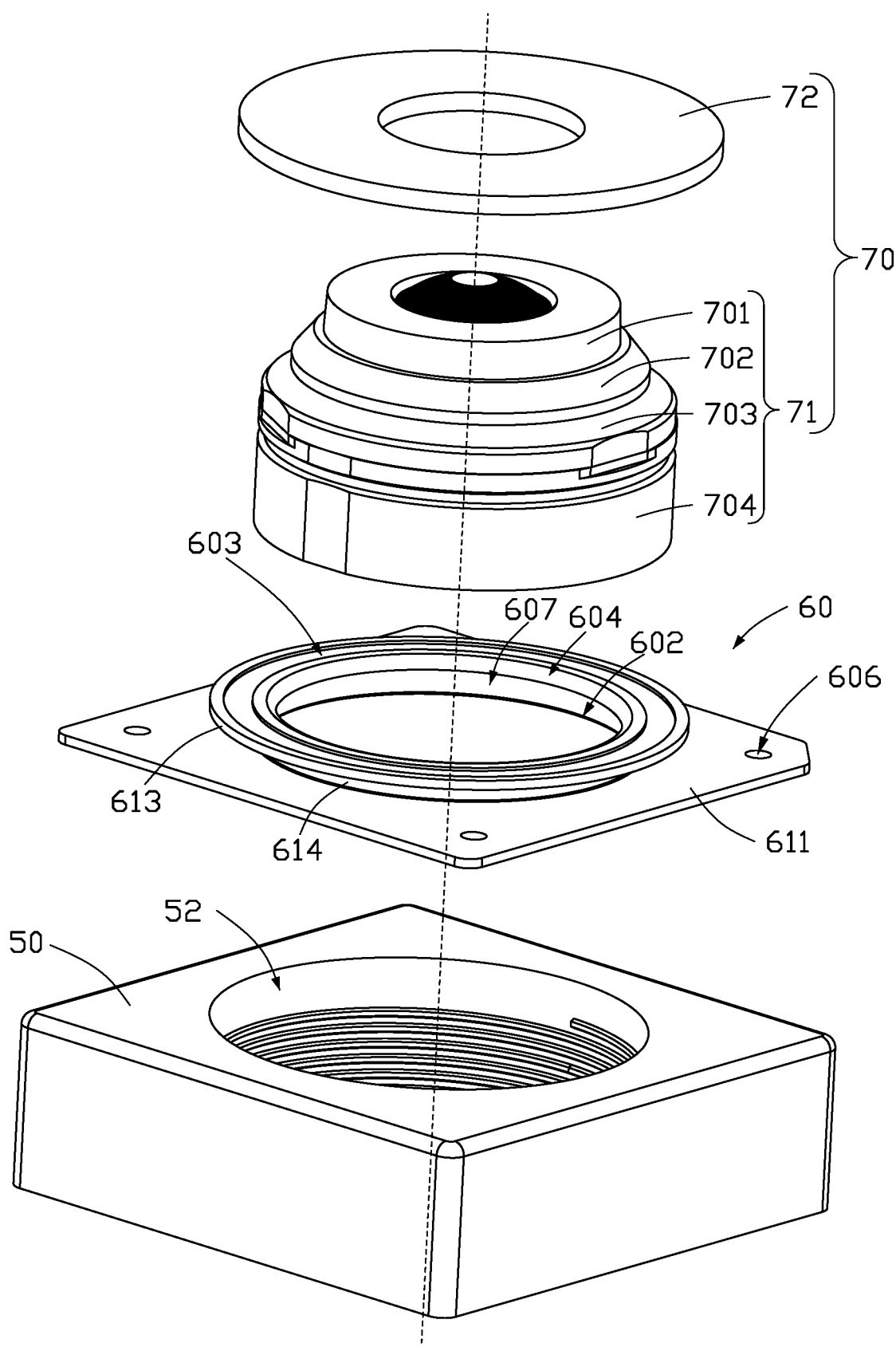
FIG. 3 is an exploded, diagrammatic view of an embodiment of a part of a camera module of according to the present disclosure.
Figure 4:
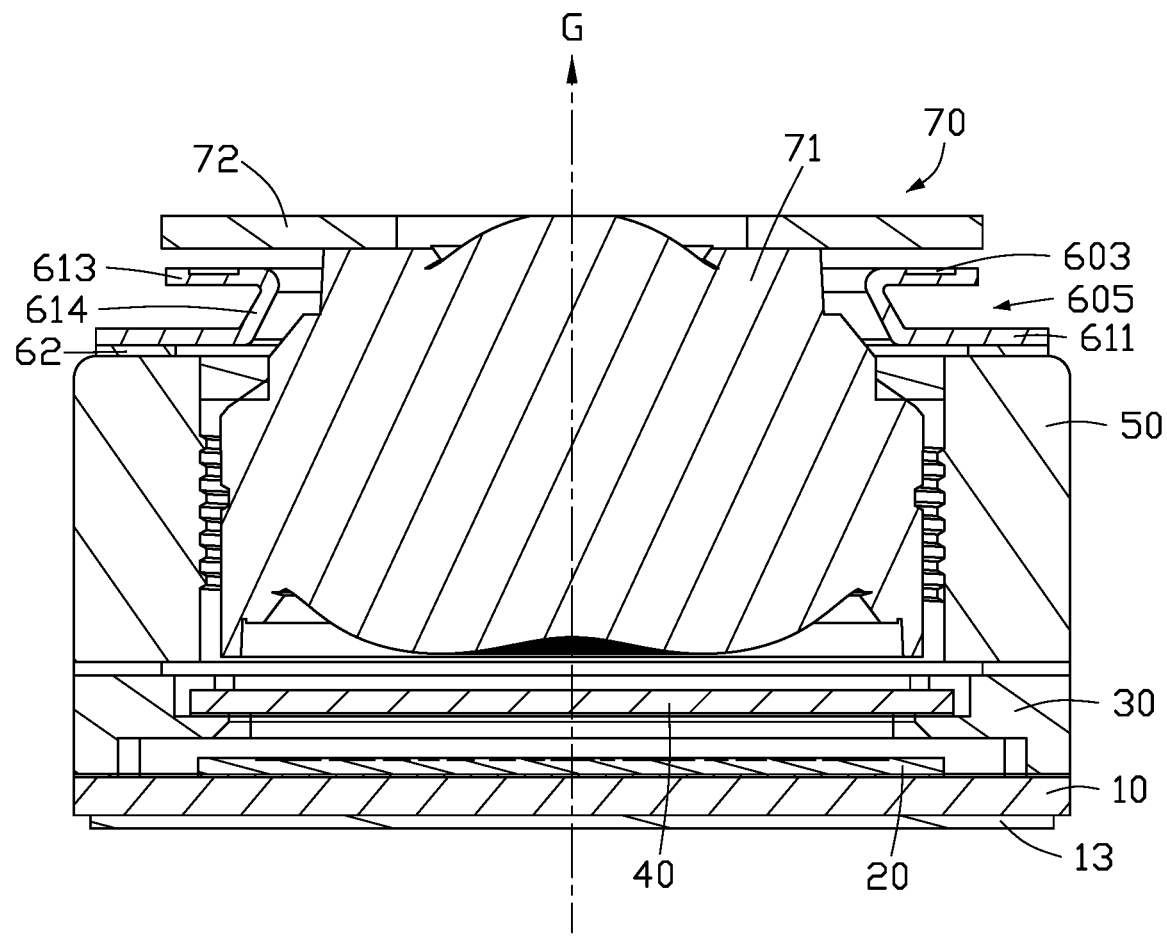
FIG. 4 is a cross-sectional view of the camera module taken along IV-IV line of FIG. 1.

Referring to FIGS. 2, 3, and 4, the dustproof member 60 includes a base plate 611, a dustproof plate 613, and a connecting portion 614. An inner surface of the base plate 611 surrounds to form a first through hole 602, and an inner surface of the dustproof plate 613 surrounds to form a second through hole 604. The connecting portion 614 is in a shape of a hollow barrel and has a hollow cavity 607. Two opposite ends of the connecting portion 614 are respectively connected to an end of the inner surface of the base plate 611 and an end of the inner surface of the dustproof plate 613.

In at least one embodiment, the base plate 611 may be substantially rectangular, the first through hole 602 may be substantially circular, the dustproof plate 613 may be substantially annular.

A surface of the dustproof plate 613 facing away from the base plate 611 is recessed inward to form a dustproof groove 603 for containing dust particles. The dustproof groove 603 may be annular and arranged around the second through hole. A dustproof glue may be pasted in the dustproof groove 603 for attracting the dust particles.

The base plate 611, the dustproof plate 613, and the connecting portion 614 cooperate to form a dust collecting groove 605 (shown in FIG. 4). The dust collecting groove 605 is located between the base plate 611 and the dustproof plate 613. In at least one embodiment, a glue may be pasted in the dust collecting groove 605 to attract dust particles.

A side of the base plate 611 facing away from the dustproof plate 613 is connected to the voice coil motor 50. The first through hole 602 corresponds to the receiving hole 52. In at least one embodiment, a diameter of the first through hole 602 is equal to or less than a diameter of the receiving hole 52. A plurality of positioning holes 606 penetrate the base plate 601 for positioning the base plate 601 on the voice coil motor 50.

In at least one embodiment, the connecting portion 614 surrounds along a central axis G to define the hollow cavity 607. Along a direction perpendicular to the central axis a diameter of the hollow cavity 607 gradually decreases from the base plate 611 to the dustproof plate 613, so as to further prevent dust from entering.

Referring to FIGS. 2 and 4, the dustproof member 60 may be fixed on the voice coil motor 50 by a fifth adhesive layer 62.

The lens assembly 70 may include a main body 71 and a dust cover 72. A portion of the main body 71 is received in the receiving hole 52. The dust cover 72 is arranged on an end of the main body 71 facing away from the voice coil motor 50.

The main body 71 is formed by at least one lens portion. In at least one embodiment, the main body 71 may include a first lens portion 701, a second lens portion 702, a third lens portion 703, and a fourth lens portion 704. The first lens portion 701, the second lens portion 702, the third lens portion 703, and the fourth lens portion 704 are connected in that sequence. The dust cover 72 is located at a side of the first lens portion 701 facing away from the second lens portion 702. In at least one embodiment, a diameter of the first lens portion 701, a diameter of the second lens portion 702, a diameter of the third lens portion 703, and a diameter of the fourth lens portion 704 may increase in that sequence. The first lens portion 701, the second lens portion 702, the third lens portion 703, and the fourth lens portion 704 may be integrally molded to form the main body 71.

Figure 5:
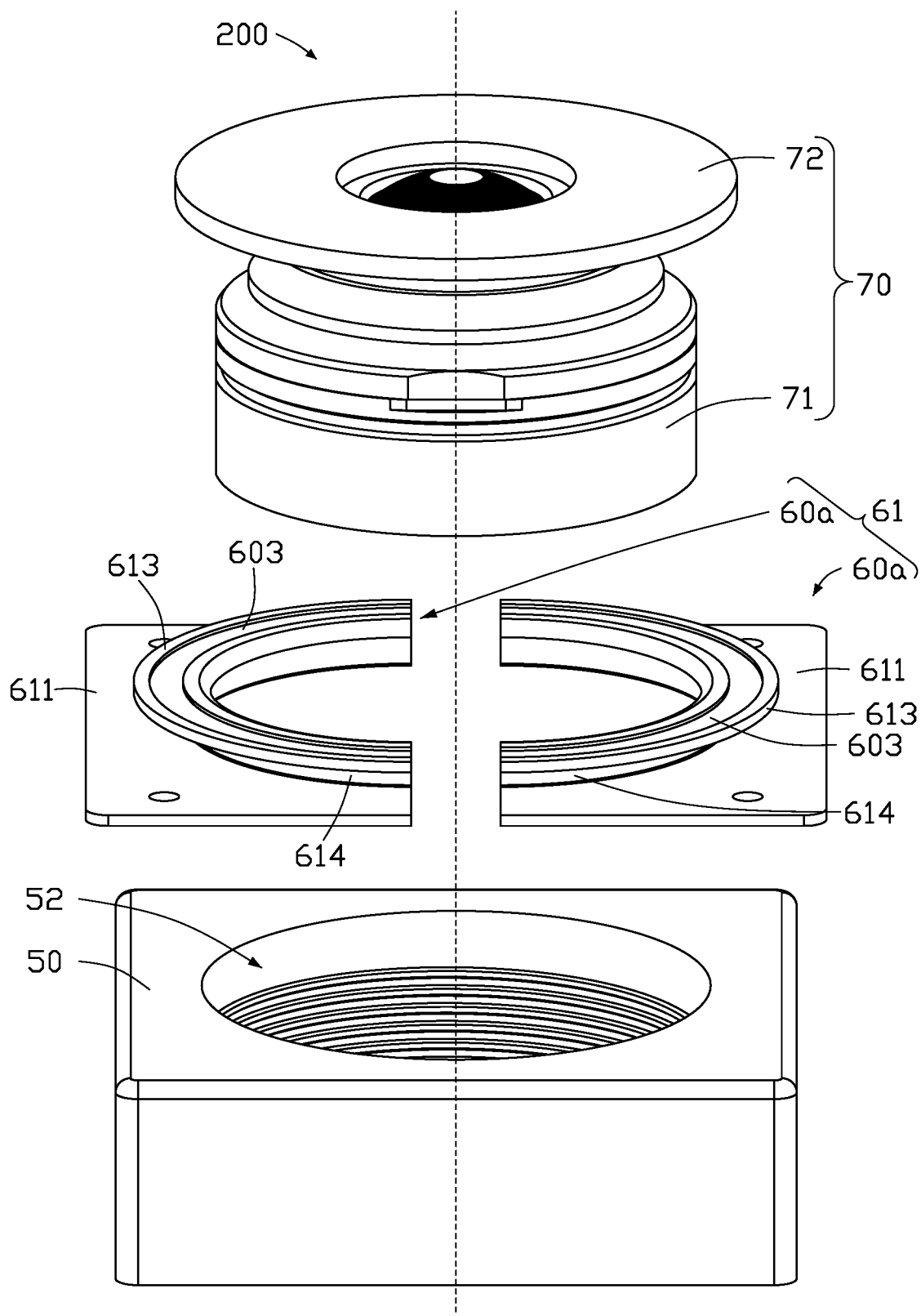
FIG. 5 is an exploded, diagrammatic view of another embodiment of a part of a camera module according to the present disclosure.

FIG. 5 illustrates a second embodiment of a part of a camera module 200. The camera module 200 is different from the camera module 100 in that the dustproof member 60 is divided into at least two sub-dustproof parts 60a along the central axis G Each of the sub-dustproof parts 60a includes a part of the base plate 611, a part of the dustproof plate 613, and a part of the connecting portion 614.

Figure 6:
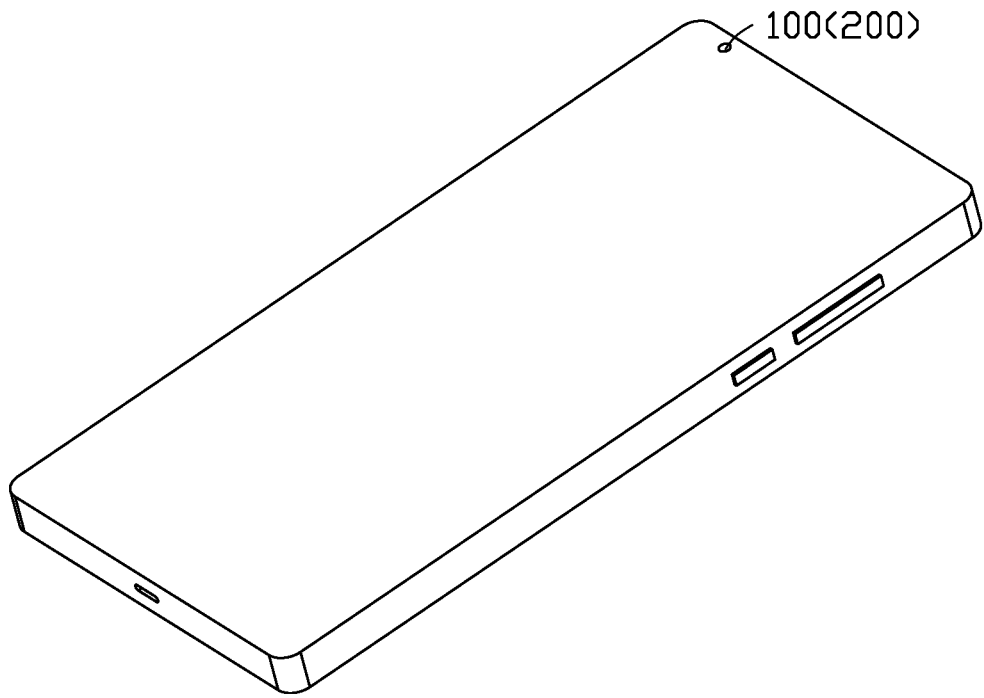
FIG. 6 is a diagram of an embodiment of an electronic device according to the present disclosure.

FIG. 6 illustrates an embodiment of an electronic device 300 including the above camera module 100 or 200. The electronic device 300 may be, but not limited to, a mobile phone, a wearable device, a computer device, a vehicle or a monitoring device.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A camera module comprising:
a voice coil motor comprising a receiving hole;
a lens assembly; and
a dustproof member comprising:
 a base plate, wherein a first through hole is defined by an inner surface of the base plate;
 a dustproof plate, wherein a second through hole is defined by an inner surface of the dustproof plate; and
 a connecting portion;
wherein the connecting portion has a shape of a hollow barrel and defines a hollow cavity, two opposite ends of the connecting portion are respectively connected to an end of the inner surface of the base plate and an end of the inner surface of the dustproof plate, thereby forming a dust collecting groove between the base plate and the dustproof plate; the lens assembly sequentially extends through the first through hole, the hollow cavity and the second through hole, a part of the lens assembly is located on a side of the dustproof plate facing away from the base plate, the voice coil motor is located on a side of the base plate facing away from the dustproof plate, a part of the lens assembly is received in the receiving hole, a surface of the base plate facing away from the dustproof plate is connected to the voice coil motor, the first through hole corresponds to the receiving hole; the connecting portion surrounds along a central axis to define the hollow cavity, along a direction perpendicular to the central axis, a diameter of the hollow cavity gradually decreases from the base plate to the dustproof plate.

2. The camera module of claim 1, wherein a surface of the dustproof plate facing away from the base plate is recessed inward to form a dustproof groove.

3. The camera module of claim 2, wherein a dustproof glue is pasted in the dustproof groove.

4. The camera module of claim 1, wherein the connecting portion surrounds along a central axis to define the hollow cavity, along a direction perpendicular to the central axis, a diameter of the hollow cavity linearly decreases from the base plate to the dustproof plate.

5. The camera module of claim 1, wherein the connecting portion surrounds along a central axis to define the hollow cavity, the dustproof member is divided into at least two sub-dustproof parts along the central axis, each of the at least two sub-dustproof parts includes a part of the base plate, a part of the dustproof plate, and a part of the connecting portion.

6. The camera module of claim 1, wherein along a same direction, a diameter of the first through hole is equal to or less than a diameter of the receiving hole.

7. An electronic device comprising:
a camera module comprising:
a voice coil motor comprising a receiving hole;
a lens assembly; and
a dustproof member comprising:
a base plate, wherein a first through hole is defined by an inner surface of the base plate;
a dustproof plate, wherein a second through hole is defined by an inner surface of the dustproof plate; and
a connecting portion;
wherein the connecting portion has a shape of a hollow barrel and defines a hollow cavity, two opposite ends of the connecting portion are respectively connected to an end of the inner surface of the base plate and an end of the inner surface of the dustproof plate, thereby forming a dust collecting groove between the base plate and the dustproof plate; the lens assembly sequentially extends through the first through hole, the hollow cavity and the second through hole, a part of the lens assembly is located on a side of the dustproof plate facing away from the base plate, the voice coil motor is located on a side of the base plate facing away from the dustproof plate, a part of the lens assembly is received in the receiving hole, a surface of the base plate facing away from the dustproof plate is connected to the voice coil motor, the first through hole corresponds to the receiving hole; the connecting portion surrounds along a central axis to define the hollow cavity, along a direction perpendicular to the central axis, a diameter of the hollow cavity gradually decreases from the base plate to the dustproof plate.

8. The electronic device of claim 7, wherein a surface of the dustproof plate facing away from the base plate is recessed inward to form a dustproof groove.

9. The electronic device of claim 8, wherein a dustproof glue is pasted in the dustproof groove.

10. The electronic device of claim 7, wherein the connecting portion surrounds along a central axis to define the hollow cavity, along a direction perpendicular to the central axis, a diameter of the hollow cavity linearly decreases from the base plate to the dustproof plate.

11. The electronic device of claim 7, wherein the connecting portion surrounds along a central axis to define the hollow cavity, the dustproof member is divided into at least two sub-dustproof parts along the central axis, each of the at least two sub-dustproof parts includes a part of the base plate, a part of the dustproof plate, and a part of the connecting portion.

12. The electronic device of claim 7, wherein along a same direction, a diameter of the first through hole is equal to or less than a diameter of the receiving hole.

* * * * *